United States Patent [19]

Ming

[11] Patent Number: 4,645,905
[45] Date of Patent: Feb. 24, 1987

[54] FOLDABLE HOUSEHOLD APPLIANCE

[75] Inventor: Wong K. Ming, Kowloon, Hong Kong

[73] Assignee: Dart Industries, Inc., Northbrook, Ill.

[21] Appl. No.: 705,091

[22] Filed: Feb. 27, 1985

[51] Int. Cl.⁴ .......................... E05D 11/10; F24H 1/20
[52] U.S. Cl. ..................................... 219/297; 219/310; 219/312; 219/429; 219/434; 219/385; 219/386; 16/330; 16/329; 16/327; 16/328; 16/297
[58] Field of Search ............... 219/312, 310, 311, 214, 219/385, 386, 429, 297, 434; 16/297, 292, 295, 321, 329, 327, 328, 330, 350, 351, 352

[56] References Cited

U.S. PATENT DOCUMENTS

| | | | |
|---|---|---|---|
| 385,138 | 6/1888 | Reinisch | 16/297 |
| 1,635,566 | 7/1927 | Victorsohn | 16/322 |
| 1,769,893 | 5/1929 | Uhl | 126/275 E |
| 2,574,250 | 11/1951 | Dalton | 16/329 |
| 3,157,433 | 11/1964 | Davis | 16/327 |
| 3,419,295 | 12/1968 | Small | 16/329 |
| 3,878,360 | 4/1975 | Augustine | 219/312 |

FOREIGN PATENT DOCUMENTS 468660 11/1928 Fed. Rep. of Germany ........ 16/328

Primary Examiner—Nicholas P. Godici
Assistant Examiner—Karen Skillman
Attorney, Agent, or Firm—Gregory J. Mancuso

[57] ABSTRACT

A small foldable household appliance having an elevated body supported by a stand, and having a safety hinge by which the appliance can be locked in an unfolded operating position, and by which the appliance can be folded for storage by depressing small buttons on either side of the appliance.

21 Claims, 16 Drawing Figures

FOLDABLE HOUSEHOLD APPLIANCE

BACKGROUND OF THE INVENTION

1. Field of the Invention

The invention relates to small household appliances, such as countertop and undercabinet instant coffeemakers and can openers. In particular, the invention relates to a household appliance comprising a support and a body pivotally connected thereto, such that the appliance can be folded for storage and unfolded and locked into position for use.

2. Description of the Prior Art

Small countertop household appliances are well known. However, applicant is aware of no prior art which discloses or suggests an appliance which can be folded for compact storage and conveniently unfolded and locked in an operating position. Conventional countertop and undercabinet appliances take up a significant amount of room in the kitchen. As the number of small appliances in homes increases, and as the size of homes decreases, countertop space and under counter storage space becomes more limited.

A conventional countertop electric instant coffee or tea maker may comprise a water heating reservoir supported by a stand so that a receptacle for coffee or tea can be placed under the water heating reservoir during use. Such an item is difficult to conveniently store because of its size and irregular configuration. What has been needed, but not shown or suggested by the prior art, is an appliance which can be unfolded and locked into operating position for use, and which can be folded compactly for storage.

SUMMARY OF THE INVENTION

The invention comprises a foldable household appliance having a support comprising a base and upright arms, and a body comprising a box-like structure cantilevered from and pivotally connected to the upper portions of the arms. The pivot connection includes a first hinge portion on either the body or the support, and a co-axial second hinge portion on the other of the body or support. The first hinge portion has a cavity or bore which allows a locking member to slide along the hinge axis. The bore includes means, such as a non-cylindrical interior, to prevent rotation of the locking member around the axis. The second hinge portion has an opening on the axis, and interlocking means which prevent rotation of the locking member with respect to the second hinge portion when they are engaged. The interlocking means can conveniently take the form of depressions in the second hinge portion which engage projections in the locking member. A biasing means, such as a spring, biases the locking member in engagement with the second hinge member. An axle extends through the opening in the first hinge portion and engages the locking member. The axle may include a button at one end adjacent to the second hinge member. The axle is movable along the axis, as by depressing the button, to move the locking member against the biasing means and out of engagement with the second hinge member.

In the normal position, the biasing means urges the locking member against the second hinge member to lock the second hinge member and the first hinge member in a predetermined rotational position. The first and second hinge members are restricted from moving rotationally with respect to one another by the simultaneous interaction of the locking member with the first hinge member and with the second hinge member. The first and second hinge members are restricted from moving relative to one another transverse to the axis by the same interaction. The biasing means will tend to force the first and second hinge members apart. To restrict the movement of the first and second hinge members relative to one another along the axis, the first hinge member may be provided with an orifice through which a portion of the axle projects. The projecting portion of the axle may be provided with an enlarged portion which restricts movement of the axle through the orifice in the direction urged by the biasing means.

When the button is depressed and the axle is moved along the axis to urge the locking member against the biasing means, the locking member disengages the second hinge member and slides into the bore in the first hinge member. When the locking member is out of engagement with the second hinge member, the first and second hinge members can be rotated about the axis relative to one another. The axle engages the second hinge member and the locking member, to restrict relative movement of the first and second hinge members transverse to the axis. The interlocking means on the locking member and the second hinge member may be designed such that when the desired rotational position of the first and second hinge members relative to one another is achieved, the first and second hinge members are locked into that rotational position. Thus, the appliance body may be locked in an unfolded position relative to the support, for operation, and may be rotated and locked into a folded position for storage.

The body of the appliance of this invention comprises a box-like structure having planar, generally parallel sides, a flat bottom generally perpendicular to the sides, a generally planar hinged top generally parallel to the bottom, and a generally planar back. At each of the two lower corner of the back are either a first hinge portion or a second hinge portion. The exterior configuration of each of the back hinge portions is generally cylindrical, with the axes co-axial and generally perpendicular to the sides. The lower back portions of the sides have cut-outs which form hook-like portions in the sides. The hook-like portions mate with the cylindrical exteriors of the hinge portions. The top portion of the back has openings which allow it to be screwed into the upper portion of the body. When assembled, the outermost edges of the back hinge portions are generally flush with the sides of the body. Disposed in the body is a reservoir for heating liquids such as water. Levers on the front of the body control the heating and dispensing functions.

The support comprises a foot or base, which can accomodate a cup for receiving hot liquid, and parallel raised arms at the sides of the base and generally perpendicular to the base. The tops or upper shoulders of the raised arms are proximate the hinge portions in the back of the body, and bear the other hinge portions. The height of the arms is roughly the same as the depth of the body, so that when the appliance is folded the front of the body is immediately proximate the base and the lower portions of the sides are proximate the raised arms of the support.

DESCRIPTION OF THE PREFERRED EMBODIMENT

Figure 1:
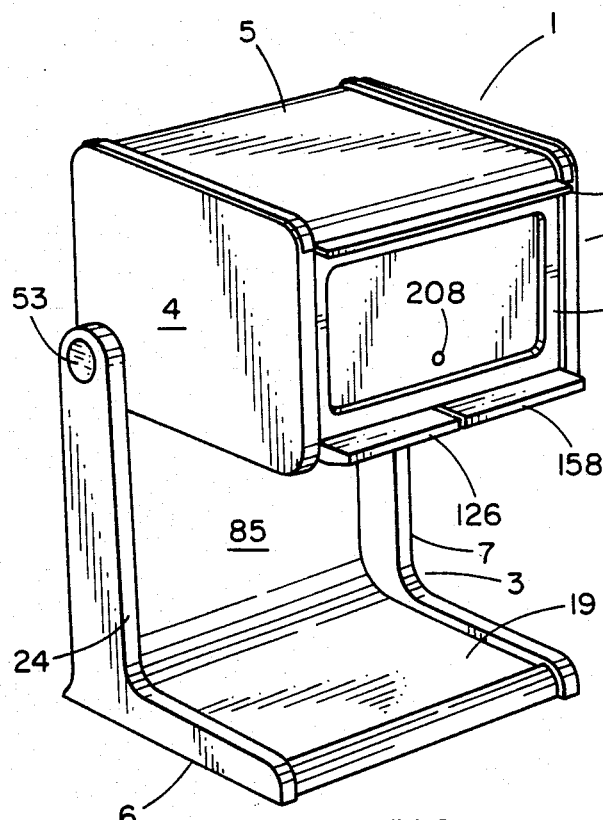
FIG. 1 is a front perspective view of a liquid heating and dispensing device embodying the invention, in an unfolded position.
Figure 2:
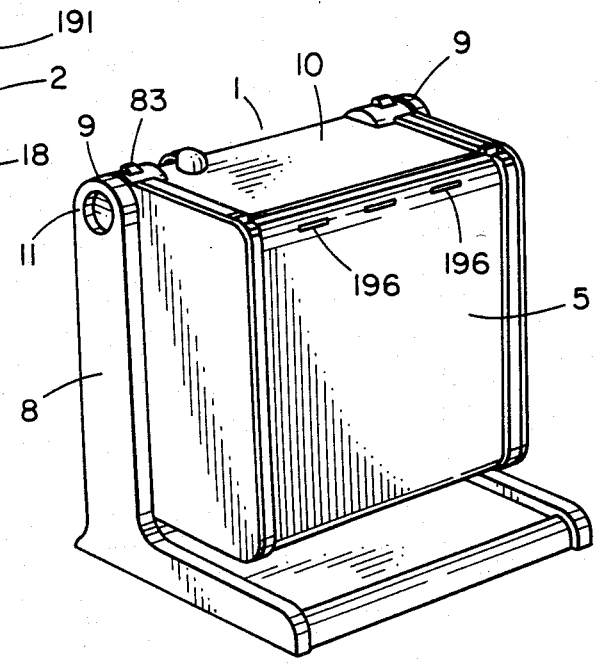
FIG. 2 is a front perspective view of the device of FIG. 1, in a folded position.
Figure 3:
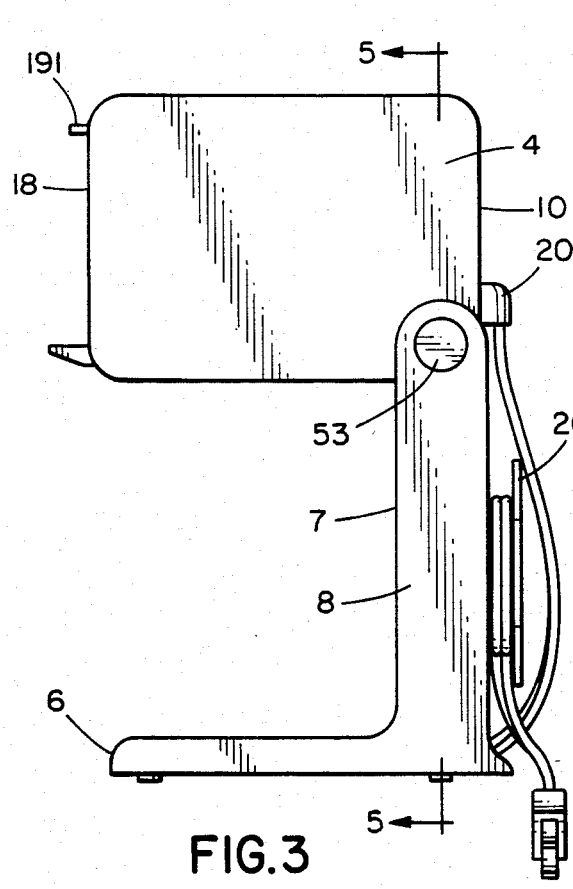
FIG. 3 is a side elevation view of the device of FIG. 1.

Referring to the drawings, FIGS. 1-4 show a countertop water heating and dispensing appliance 1. The appliance includes a body 2 and a support 3, preferably constructed of molded plastic. Body 2 comprises side walls 4 and closure 5. Support 3 comprises a base 6 and a frame 7 extending upwardly from base 6. Frame 7 comprises sides 8 terminating in upper shoulders 9. Body 2 is pivotally connected to support 3, to allow appliance 1 to be folded compactly for storage as shown in FIG. 2. The height of appliance 1 when unfolded is about 10 inches (25 centimeters) and the width is about 6 inches (15 centimeters).

Figure 4:
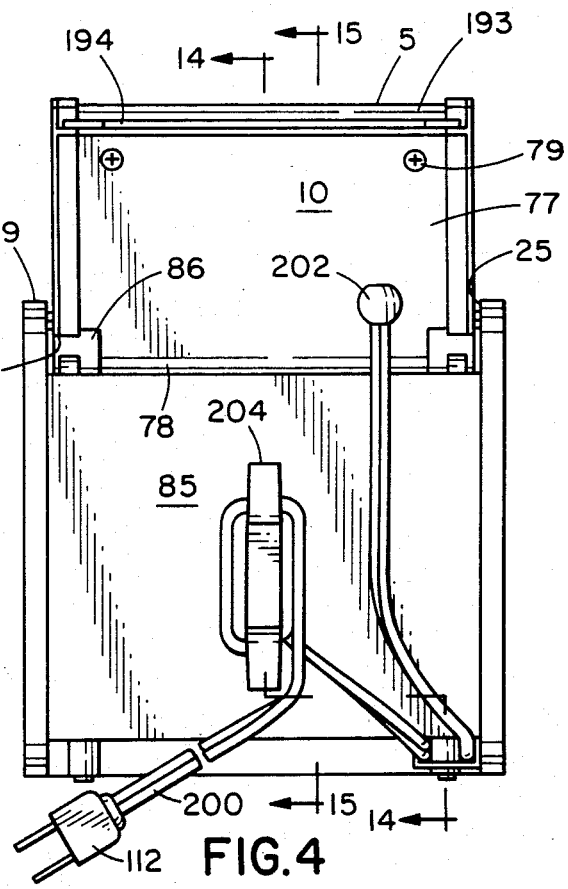
FIG. 4 is a back elevation view of the device of FIG. 1.
Figure 5:
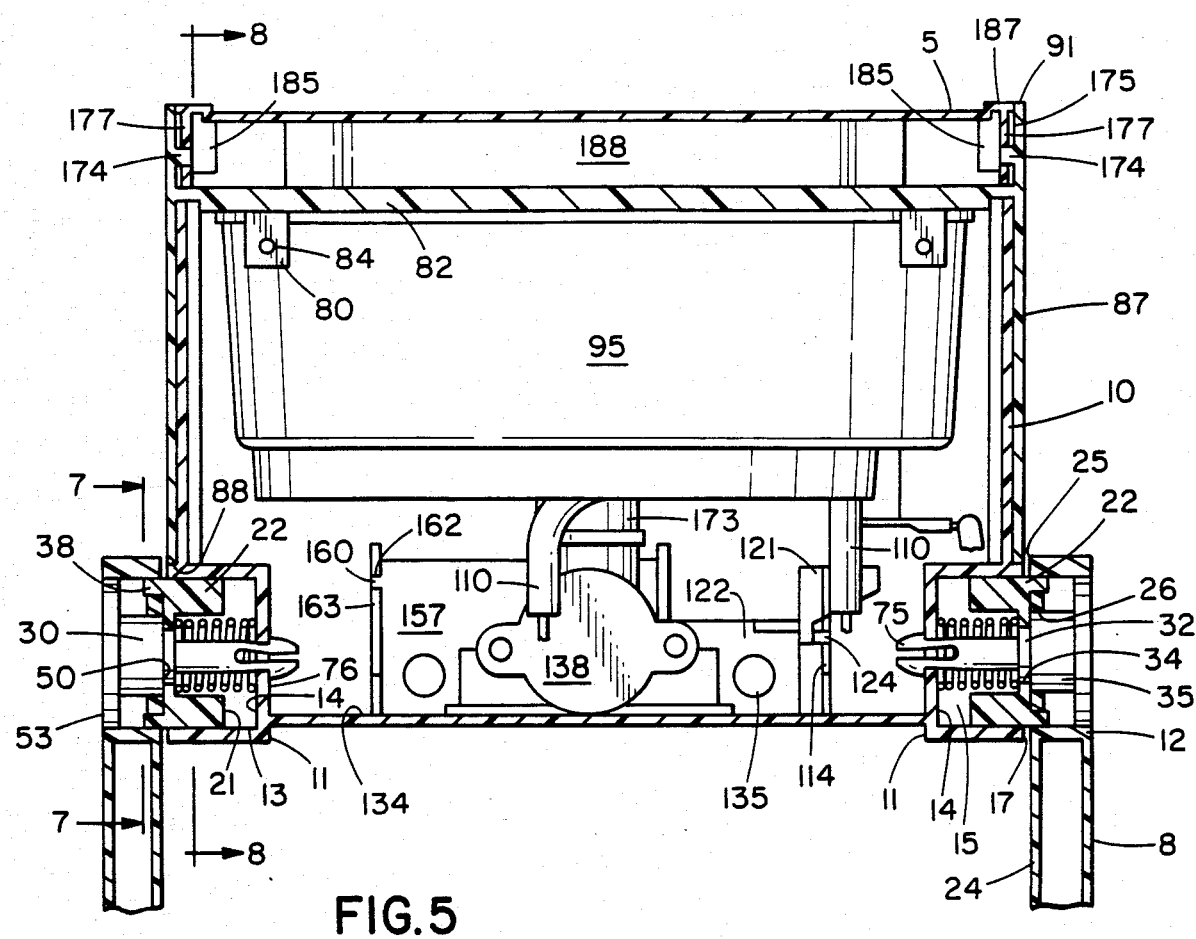
FIG. 5 is a sectional view taken on line 5—5 of FIG. 3, showing the hinged area in section.
Figure 6:
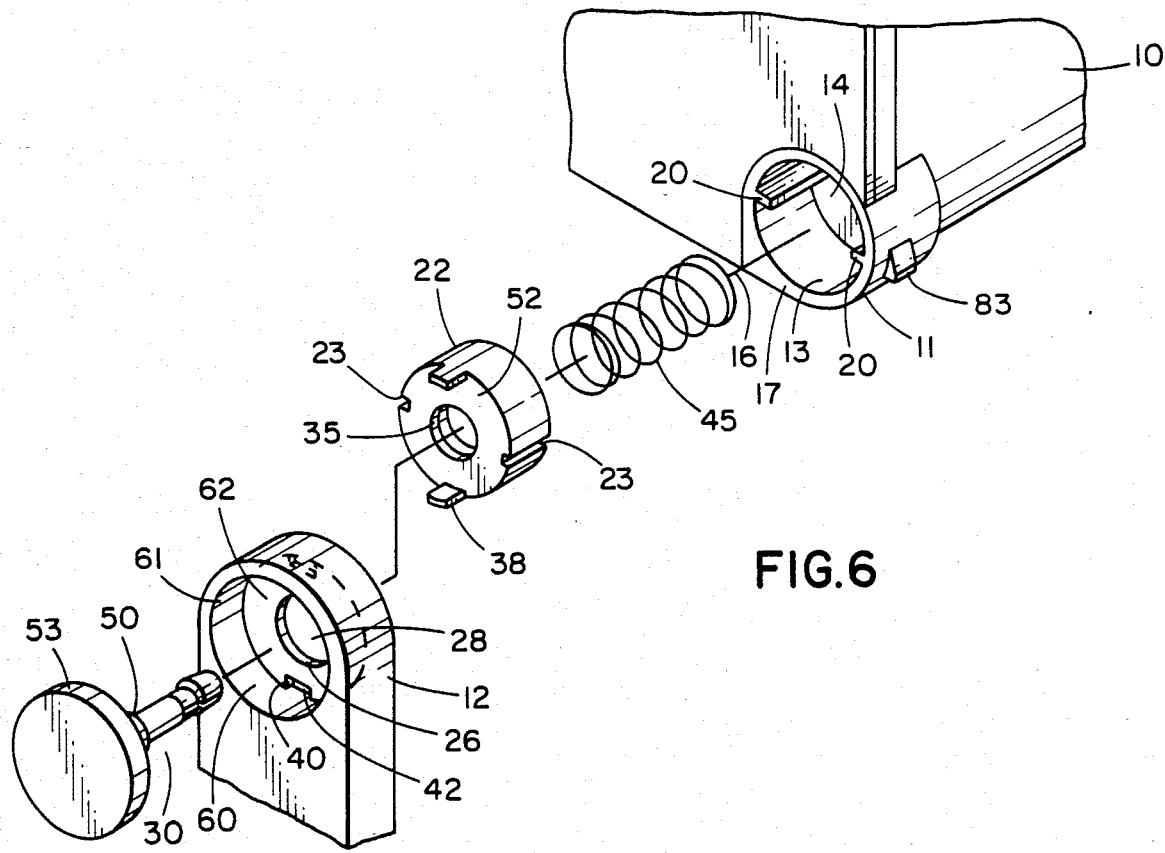
FIG. 6 is an enlarged, exploded perspective view of one pair of hinge members and associated parts.
Figure 7:
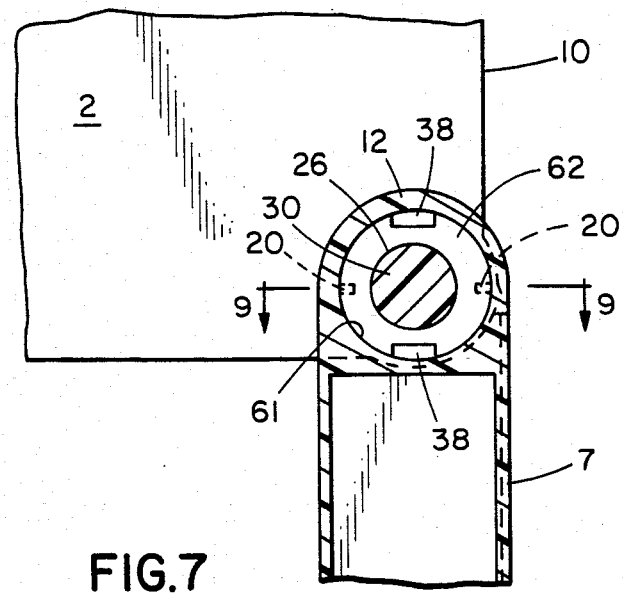
FIG. 7 is a sectional view taken on line 7—7 of FIG. 5, showing one pair of hinge members in a locked position.

FIG. 5 shows the preferred construction of the joint between body 2 and support 3. FIG. 6 shows an exploded view of the joint for clarity. Referring to FIGS. 1-5, body 2 has a generally planar front 18 and a generally parallel back 10 which is generally rectangular in shape. Proximate the lower corners of back 10 are located first hinge members 11. Proximate shoulders 9 of frame 7 are second hinge members 12.

First hinge member 11 comprises a side wall 13 and a back wall 14 which form a generally cylindrical bore 15 having a bore axis 16 parallel to side wall 13. The front surface 17 of side wall 13 is in a plane generally perpendicular to bore axis 16. Extending from side wall 13 into bore 15 are vanes 20. Locking member 22 is adapted to be received by bore 15 in slidable engagement, allowing locking member 22 to move within bore 15 along bore axis 16. Locking member rear wall 21 is generally in a plane parallel to back wall 14 of first hinge member 11. Locking member 22 has slots 23 which receive vanes 20, to prevent rotation of locking member 22 in bore 15 about bore axis 16. As will be appreciated by one skilled in the art, bore 15 need not be cylindrical, and a combination of vanes and slots are not required to prevent rotation of locking member 22 in bore 15. Any convenient configuration of bore 15 may be used which permits locking member 22 to reciprocate within bore 15 along bore axis 16 and which prevents locking member 22 from rotating within bore 15 about bore axis 16. Bore 15 and locking member 22 can be non-circular in cross-section in a plane perpendicular to bore axis 16 as, for example, oval or rectangular. Alternatively, locking member 22 may have vanes which are received by slots in side wall 13 of bore 15.

Second hinge member 12 comprises a planar first wall 25 generally perpendicular to bore axis 16 and abutting front surface 17 of side wall 13 of first hinge member 11. A passage 28 is formed in planar wall 25 by generally cylindrical wall 26. Passage 28 is aligned with bore 15 and is coaxial with bore axis 16.

Axle 30 extends along bore axis 16 through passage 28 and engages locking member 22. Axle 30 has a first cylindrical bearing surface 32 which engages cylindrical sleeve 34 of locking member 22 and a second cylindrical bearing surface 35 which engages cylindrical wall 26 of second hinge member 12. Axle 30 is the pivot shaft which allows first hinge member 11 and second hinge member 12 to pivot about bore axis 16 relative to one another, and which prevents substantial movement of first hinge member 11 and second hinge member 12 relative to one another in a direction transverse to bore axis 16. Axle 30 is movable along bore axis 16.

To enable first hinge member 11 and second hinge member 12 to be locked relative to one another in a rotational position, interlocking means are provided. The interlocking means comprise projections 38 on locking member 22 and surfaces 40 forming corresponding depressions 42 in planar first wall 25 of second hinge member 12. Projections 38 are adapted to be received by depressions 42 and to engage surfaces 40. Projections 38 are preferably formed as integral molded extensions of locking member 22 extending parallel to bore axis 16 proximate the outer perimeter 43 of locking member 22. Depressions 42 are conveniently formed as apertures in planar first wall 25. Depressions 42 are aligned with projections 38 such that when locking member 22 and second hinge member 12 are in engagement in one rotational position relative to one another, projections 38 are received by depressions 42 to prevent relative rotation of second hinge member 12 and locking member 22. When locking member 22 and second hinge member 12 are in engagement in a second rotational position relative to one another, projections 38 are out of alignment with depressions 42. In that rotational position, projections 38 engage planar wall 25 of second hinge member 12, allowing rotational movement of second hinge member 12 relative to locking member 22.

Spring 45 biases locking member 22 against second hinge member 12. Spring 45 is preferably a coil spring residing in bore 15. One end of spring 45 engages back wall 14 of first hinge member 11. The other end of spring 45 is received by recess 47 formed by lateral wall 48 and rear wall 49 of locking member 22, and engages rear wall 49.

Figure 9:
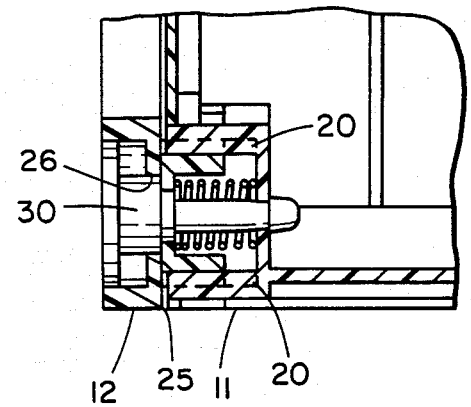
FIG. 9 is a sectional view taken on line 9—9 of FIG. 7, showing one pair of hinge members in a locked position.
Figure 10:
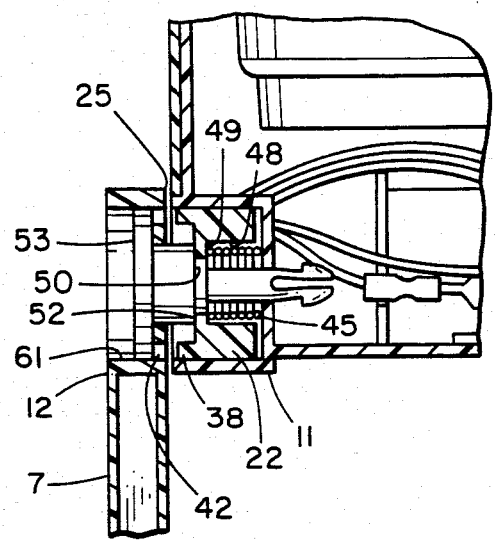
FIG. 10 is a partial sectional view of FIG. 5, with the button depressed to unlock the hinge.
Figure 11:
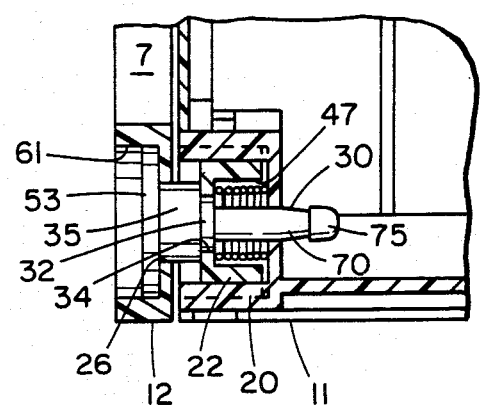
FIG. 11 is the view of FIG. 9, but with the button depressed to unlock the hinge.
Figure 12:
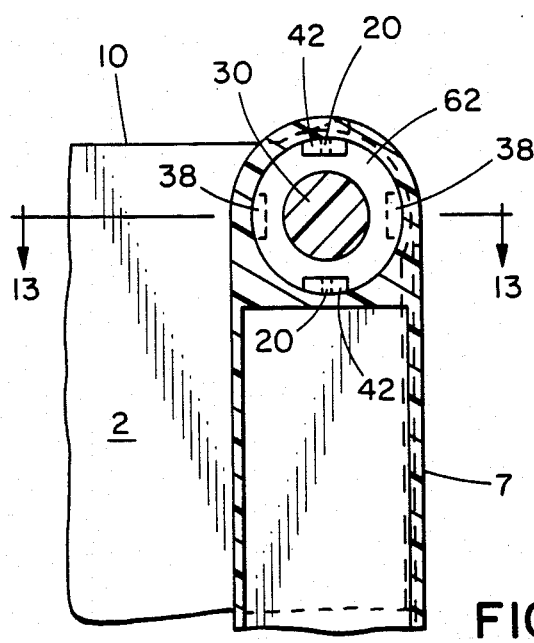
FIG. 12 is the side sectional view of FIG. 7, but with the hinge members unlocked and the appliance in a folded position.
Figure 13:
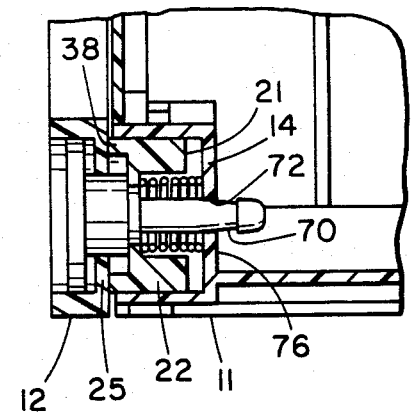
FIG. 13 is a top sectional view of the appliance in a folded position taken on line 13—13 of FIG. 12, showing one pair of hinge members in an unlocked position.
Figure 14:
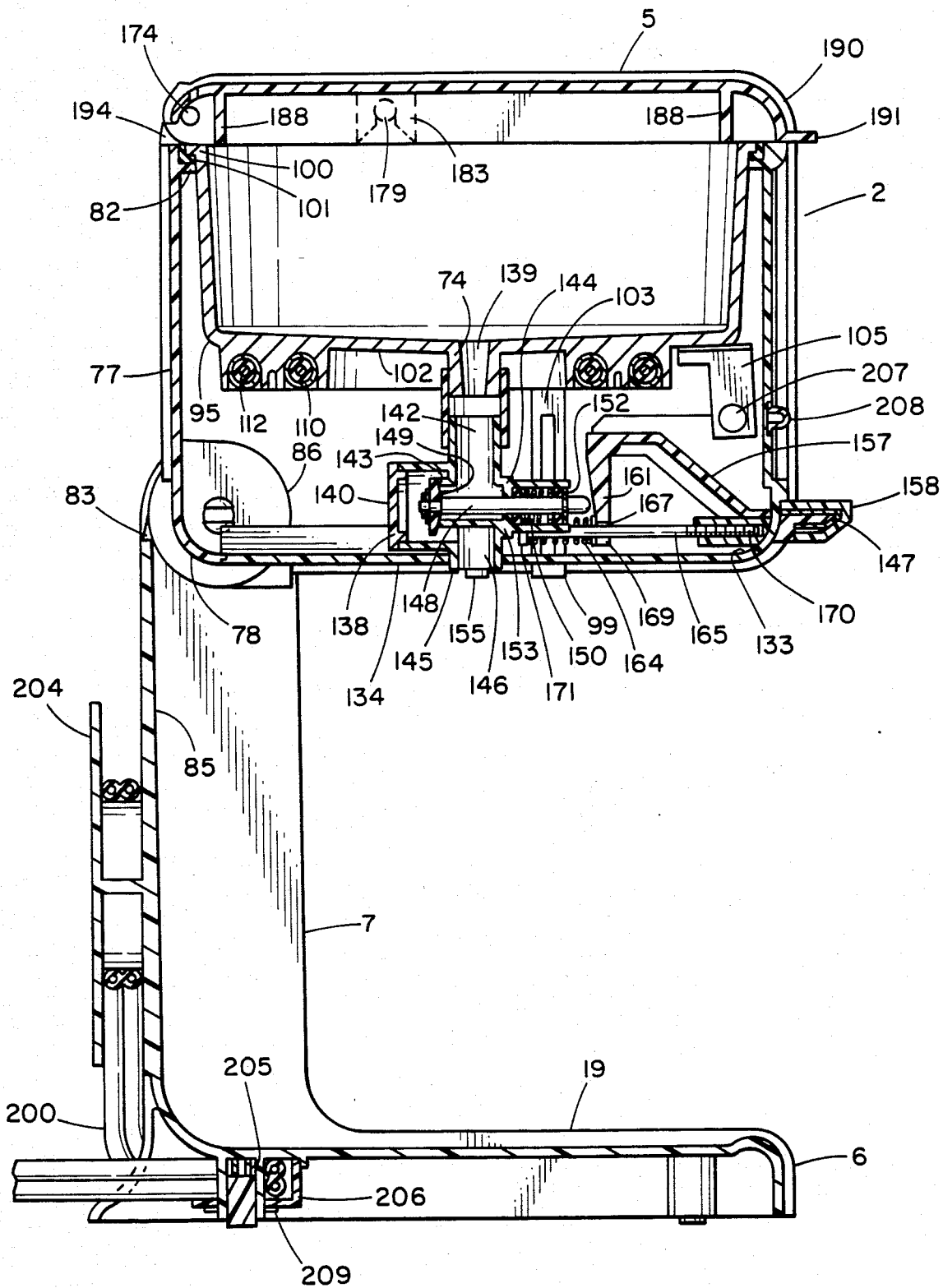
FIG. 14 is a sectional view taken on line 14—14 of FIG. 4, showing the internal configuration of parts of the appliance.
Figure 15:
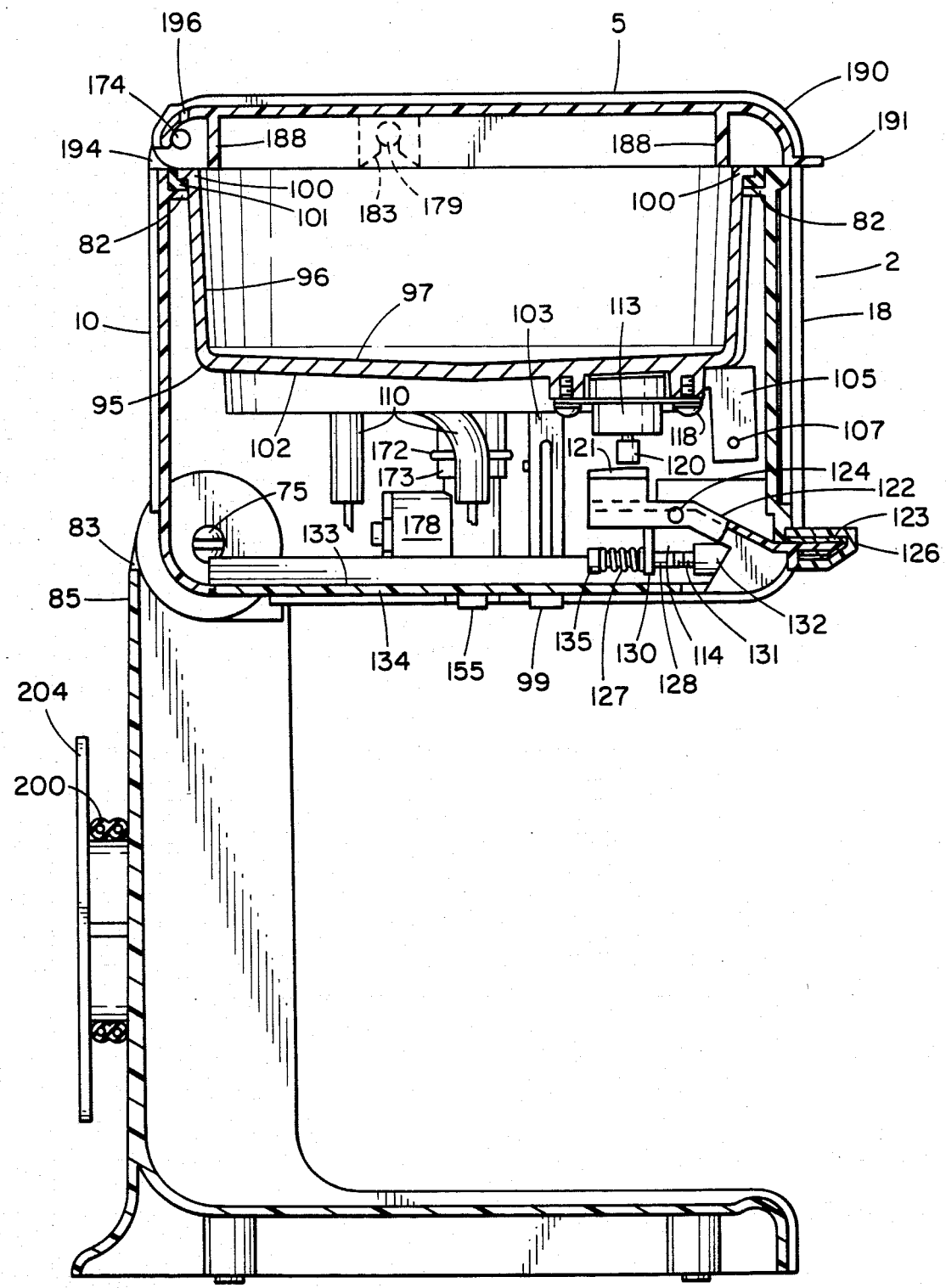
FIG. 15 is a sectional view taken on line 15—15 of FIG. 4, showing the internal configuration of parts.

To provide means to move projections 38 out of engagement with surfaces 40, thereby relieving the interlock between locking member 22 and second hinge member 12, axle 30 is provided with shoulder 50 which is adapted to engage contact surface 52 of locking member 22. Axle 30 is also provided with an engagement surface, preferably in the form of button 53, by which axle 30 can be manually moved along bore axis 16. As can best be seen in FIGS. 10 and 11, by depressing button 53 shoulder 50 of axle 30 engages contact surface 52 of locking member 22 and moves locking member 22 against spring 45 into bore 15, allowing first hinge member 11 and second hinge member 12 to be rotated relative to one another. Releasing button 53 allows spring 45 to move locking member 22 toward second hinge member 12. If projections 38 and depressions 42 are aligned, spring 45 forces locking member 22 into interlocking engagement with second hinge member 12, thereby preventing rotational movement of first hinge member 11 and second hinge member 12 relative to one another, as shown in FIGS. 5 and 9. If projections 38 and depressions 42 are not aligned, spring 45 biases projections 38 into slidable engagement with planar wall 25 of second hinge member 12, as shown in FIGS. 12 and 13. First hinge member 11 and second hinge member 12 can be rotated until projections 38 and depressions 42 are in alignment, at which point spring 45 moves locking member 22 along bore axis 16 into interlocking engagement with second hinge member 12, thereby interlocking it with first hinge member 11.

In the preferred embodiment, second hinge member 12 is provided with a cylindrical cavity 60 formed by cavity side 61 and cavity back 62. Cavity 60 is adapted to receive button 53 completely, so that button 53 does not project beyond outside wall 65 of second hinge member 12. It is also preferred that button 53 and cavity 60 be cylindrical and in bearing engagement, so that button 53 acts as a bearing for second hinge member 12, to supplement bearing surface 32 of axle 30.

In the preferred embodiment, axle 30 includes shaft 70 which projects along bore axis 16 and through orifice 72 of back wall 14 of first hinge member 11. Enlarged portion 75 at the end of shaft 70 bears against outer surface 76 of back wall 14 when first hinge member 11 and second hinge member 12 are locked, to limit movement of axle 30. It is preferred that enlarged portion 75 comprise a split pin, to facilitate assembly of the hinge and to preclude the inadvertent removal of axle 30 after assembly. In the preferred embodiment, first hinge member 11, second hinge member 12, locking member 22, and axle 30 are made of molded plastic. Also in the preferred embodiment, projections 38 and depressions 42 are oriented such that appliance 1 can be unlocked in the unfolded position only. Projections 38 would not engage surfaces 40 of depressions 42 when appliance 1 is in the folded position, so that appliance 1 can be unfolded quickly and easily.

It will be apparent to those skilled in the art that various modifications may be made without departing from the invention in its broader aspects. For example, in the type of appliance shown in FIG. 1, it is not necessary that both hinges incorporate locking mechanisms. Axle 30 need not project through back wall 14 of first hinge member 11. Enlarged portion 75 of axle 30 may be located within recess 47 of locking member 22. In the preferred embodiment described above, axle 30 is able to rotate about bore axis 16 relative to both locking member 22 and second hinge member 12 since bearing surface 32 and bearing surface 35 are cylindrical. For proper operation of the hinge, it is necessary only that axle 30 be able to rotate relative to either locking member 22 or second hinge member 12. Neither bearing surface 32 nor sleeve 34 need be cylindrical, and can be adapted to tightly interfit to prevent relative movement in any direction of axle 30 and locking member 22. Sleeve 34 need form an aperture entirely through locking member 22, but may form only a receptacle for axle 30. Projections 38 can be located on second hinge member 12 and depressions 42 can be located on interlocking member 22. The interlocking means can be structure other than projections 38 and depressions 42. Projections 38 and depressions 42 can be oriented such that appliance 1 can be locked in more than one position, e.g., in the folded position as well as in the unfolded position.

Figure 8:
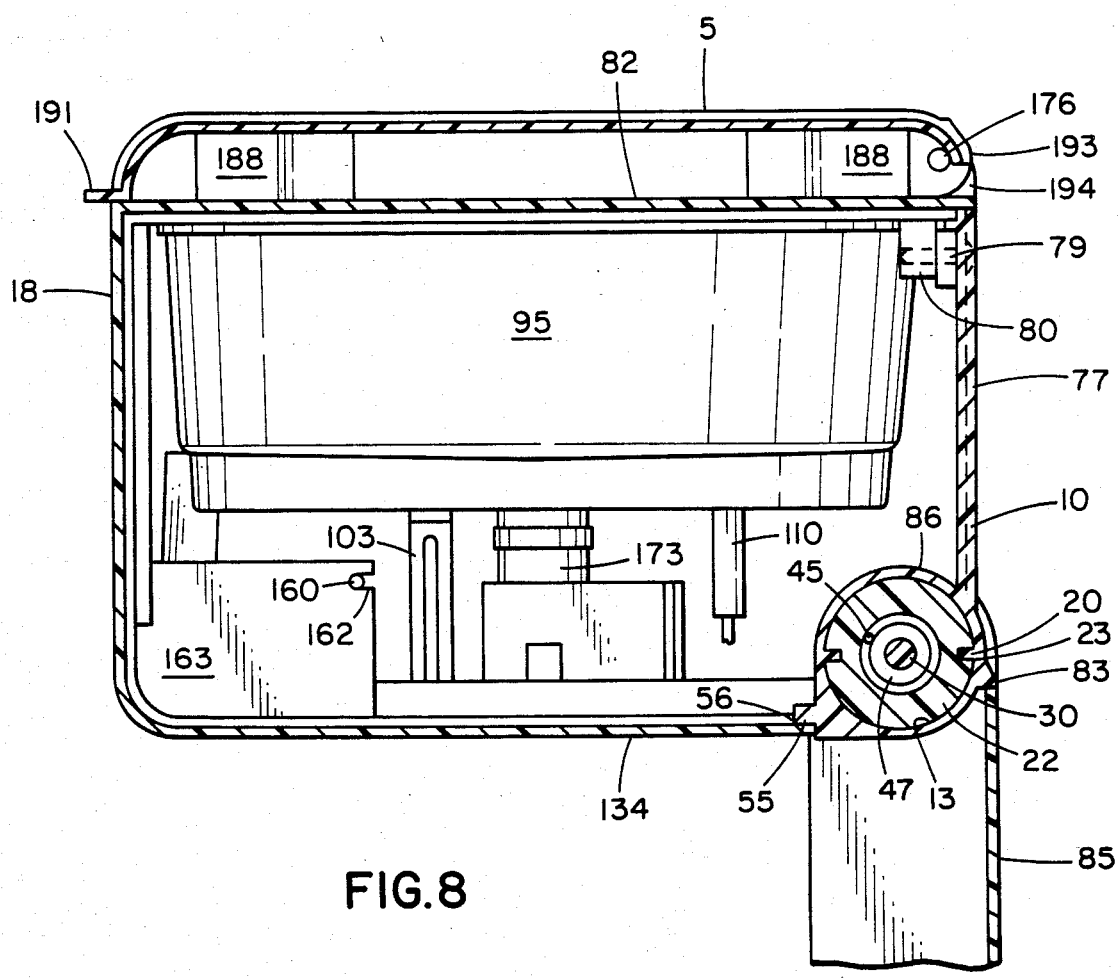
FIG. 8 is a sectional view taken on line 8—8 of FIG. 5, showing a side section of the appliance body and a hinge member.
Figure 16:
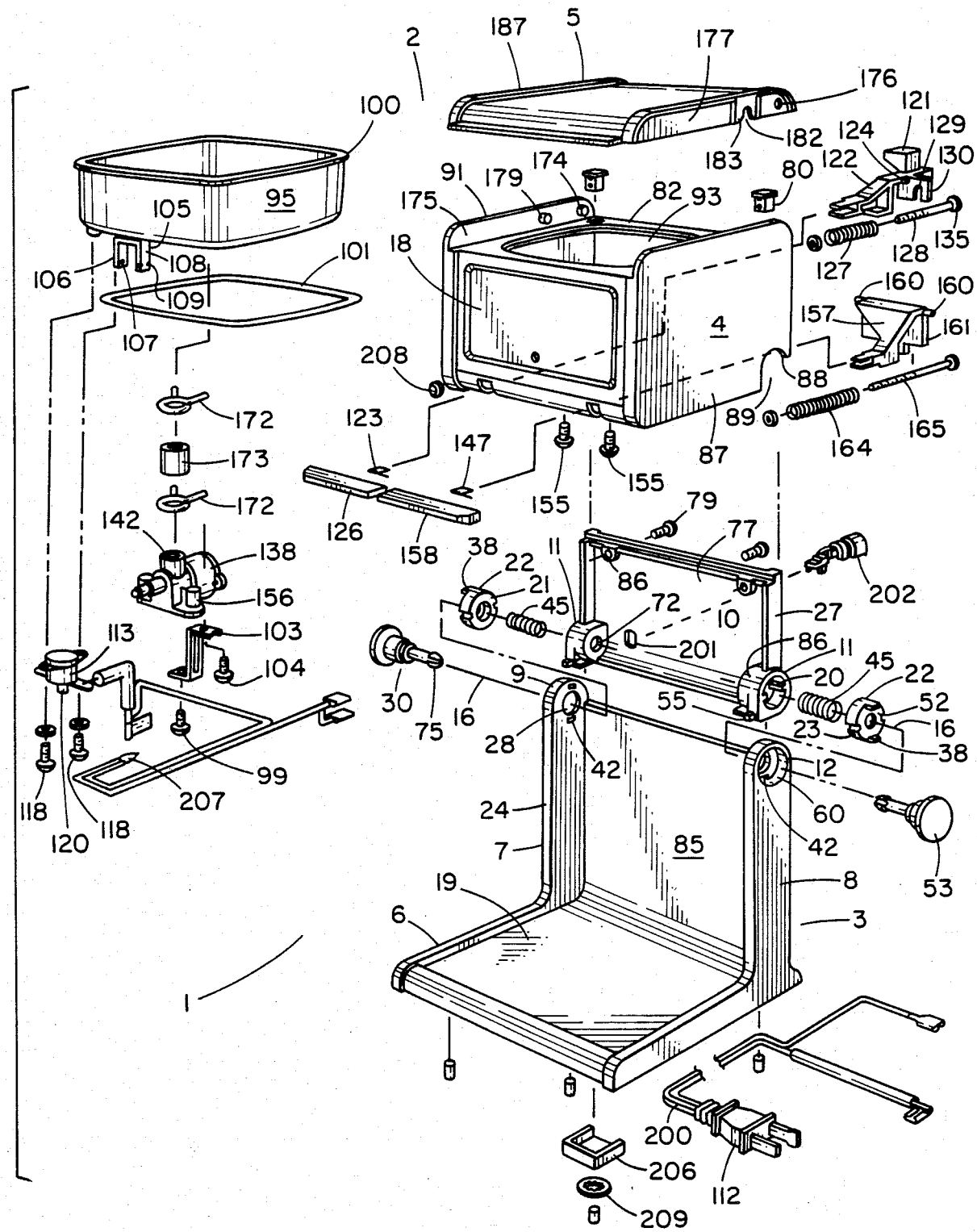
FIG. 16 is an exploded front perspective view of the appliance of this invention.

The connection of back 10 to body 2 can be best seen in FIGS. 4, 8, and 16. Back 10 comprises a generally planar upper portion 77, lower curved portion 78, and first hinge members 11. Back 10 and body 2 are connected proximate the upper edge of back 10 by screws 79. Screw posts 80 project from the underside 81 of reservoir support 82, having threaded screw holes 84 therein. Back 10 has small holes 86 proximate its upper edge, aligned with screw holes 84, through which the shanks of screws 79 are inserted.

Back 10 and body 2 are connected proximate the lower edge of back 10 by a mechanical interlock of sidewalls 4 and first hinge members 11. The exterior surfaces 86 of hinge members 11 are generally cylindrical. Sidewalls 4 are generally planar and rectangular. Curved walls 88 form hook-shaped cut-outs 89 in sidewalls 4, which conform to the exterior surfaces 86 of first hinge members 11. The distance between the front surfaces 17—ie., the width of back 10 at first hinge members 11—and the distance between the outside surfaces 87 of sidewalls 4, are substantially the same. The result is that outside surfaces 87 of sidewalls 4 and front surfaces 17 of first hinge members 11 are generally flush, front surfaces 17 not projecting beyond outside surfaces 87.

Alternative connections for back 10 and body 2 include snap-fit connections, or permanently affixing back 10 to body 2 using adhesive or by heat welding.

Support 3 preferably comprises base 6 having a substantially horizontal upper surface 19 for accomodating a container such as a coffeecup. Frame 7 extends upwardly from base 6. Frame 7 preferably comprises generally parallel rails 24, separated by planar panel 85. Rails 24 terminate in shoulders 9 which bear second hinge members 12. Body 2 is locked in a position cantilevered from frame 7, supported by first hinge members 11. Back 10 of body 2 is generally co-planar with panel 85 when appliance 1 is in the locked, unfolded position. Depressing buttons 53 unlocks body 2 from support 3, allowing body 2 to pivot downward about 90 degrees into a folded position. In the folded position, sidewalls 4 of body 2 are bracketed by rails 24, and front 18 of body 2 is parallel and adjacent to upper surface 19 of base 6.

Beams 55 project from exterior surfaces 86 and mate with recesses 56 at the junction of bottom wall 134 and sidewalls 4 of body 2. Abutments 83 project from exterior surfaces 86 and engage the top edge of panel 85 when appliance 1 is unfolded. Back 10 has perpendicular side flanges from outer surfaces 86 to the upper edge of back 10, which engage the inner surfaces of sidewalls 4.

The appliance of this invention can be either a countertop device or an under-cabinet device. For example, it may be more convenient to mount a can opener under a kitchen cabinet rather than locate in on a countertop. A can opener according to this invention would comprise the can opener mechanism as body 2, and a can opener hanger as support 3. The can opener cutting mechanism would correspond to the top surface of body 2, shown in FIG. 1 as closure 5. Support 3 would have no base 6, and would be attached to a kitchen cabinet by securing frame 7 with its back side against the underside of the cabinet with hinge members 12 toward the front of the cabinet. Frame 7 would comprise panel 85, to which would be affixed first hinge members 11. Rails 24 would be unnecessary. Bore axis 16 would be parallel to the front edge of the cabinet. In the folded position, can opener body 2 would be folded up out of the way against frame 7. In the unfolded position, can opener body 2 would extend down from frame 7 ready for use. Hinge member 12 is provided with two pairs of depressions 42 at 90 degree separation around bore axis 16, so that appliance 1 can be locked in both the folded position and in the unfolded position.

Referring to FIGS. 5, 8, 14, 15, and 16, the internal components of appliance 1 can be seen. Extending between the upper portions of sidewalls 4, and displaced below the upper edges 91 thereof, is reservoir support 82. Reservoir support 82 is generally planar, having a large opening 93 therein in which reservoir 95 is disposed. Reservoir 95 is suspended from reservoir support 82 through opening 93. Reservoir 95 is a cast aluminum cup of about 10 ounces (300 milliliters) capacity and having downwardly disposed sidewalls 96 and a bottom wall 97. Less preferably, reservoir 95 may be drawn stainless steel. Reservoir 95 should have a relatively low mass and a low heat capacity, to facilitate rapid heating of its contents.

At the upper perimeter of reservoir 95 is an annular horizontally extending flange 100 which overlays a portion of reservoir support 82, and by which reservoir 95 is supported. Between flange 100 and reservoir support 82 is disposed O-ring 101. Affixed to the underside 102 of bottom wall 97 of reservoir 95 is a metal bracket 105, having a first leg 106 with a hole 107 in it and a second leg 108 with opposed slots 109. Bracket 103 is secured to the underside of reservoir 95 by bolt 104, and is secured to bottom wall 134 of body 2 by bolt 99.

Also secured to the underside 102 of reservoir 95 is sheathed heating element 110, comprising a resistance wire element 112 sheathed in an insulating material and covered by a metal outer tubular sheath. Heating element 110 may be cast in reservoir 95, or it may be clamped in grooves in underside 102 of reservoir 95. It is preferred that heating element 110 having a rating of about 1450 watts at 120 v. A.C.

Plug 112 connects heating element 110 to a 120 v. power supply. One terminal of heating element 110 is connected directly to plug 112. The other terminal of heating element 110 is connected to plug 112 through thermostat 113. Thermostat 113 is secured to underside 102 of reservoir 95 by bolts 118 which are received by threaded openings in underside 102. Thermostat 113 is calibrated to open the electrical circuit when the liquid in the reservoir nears 100 degrees C.

Manual reset button 120 in thermostat 113 is pushed upwardly to complete the electrical circuit through heating element 110 and thermostat 113. Manual reset button 120 is depressed by arm 121 of lever 122. Lever 122 pivots about trunions 124 which are received by horizontal slots in walls 114 upstanding from inside surface 133 of bottom wall 134. Lever 122 is pivoted by depressing actuator 126, secured to lever arm 122 by clip 123. Coil spring 127 biases lever 122 out of engagement with manual reset button 120. Spring 127 is held in place by bolt 128 which passes through spring 127 and through slot 129 in flange 130 in lever 122. End 131 of bolt 128 is secured to strut 132 affixed to inside surface 133. Spring 127 is disposed between other end 135 of bolt 128 and flange 130.

Valve 138, located below drain hole 139 in reservoir 95, controls the flow of liquid from reservoir 95. Valve 138 comprises a shell 140 having a liquid entry 142, valve seat 143, valve rod guide 144, and liquid exit 146. End 145 of liquid exit 146 is immediately below bottom wall 134. At the end of rod 148 is head 149, biased against valve seat 143 by spring 150 around rod 148. Spring 150 applies force between rod bushing 152 and valve wall 153. Valve 138 is affixed to bottom wall 134 by screws 155 which pass through bottom wall 134 and seat in screw holes 156.

Valve 138 is actuated by lever 157. Depressing actuator 158 pivots lever 157 on trunions 160, causing lever arm 161 to depress valve rod 148, moving head 149 away from valve seat 143 and allowing liquid to flow through valve 138. Trunions 160 are received in horizontal slots 162 in raised walls 163 affixed to bottom wall 134. Lever 157 is biased away from valve 138 by coil spring 164. Spring 164 is held in place by bolt 165 which passes through spring 164 and through slot 167 in flange 169 in lever 157. End 170 of bolt 165 is secured to a strut affixed to the inside surface 133. Spring 164 is disposed between other end 171 of bolt 165 and flange 169. Actuator 158 is secured to lever 157 by clip 147.

Valve 138 is connected to drain hole 139 by hose 173, which is secured to spout 74 of reservoir 95 by clamps 172.

As can best be seen in FIGS. 5, 8, and 16, closure 5 is hinged to body 2 by cylindrical hinge pins 174 projecting from inner surfaces 175 of sidewalls 4, immediately below upper edges 91. Hinge pins 174 are received by apertures 176 in sides 177 of closure 5. Snap pins 179 of about the same diameter and length as hinge pins 174 also project from inner surfaces 175 at about the same distance below upper edges 91 as hinge pins 174. Snap pins 179 are located about one-third of the distance from back 10 and front 18 of body 2. Sides 177 bear C-shaped receptacles 182 having flexible arms 183. When closure 5 is closed, receptacles 182 receive snap pins 179 in friction fit, to secure closure 5 closed.

Sides 177 are generally planar and parallel and spaced from one another a distance such that when closure 5 is closed sides 177 are closely proximate inner surfaces 175, to restrict the flow of steam from reservoir 95 to the exterior of appliance 1. Adjacent to receptacles 182 are planar baffles 185 which also serve to restrict the flow of steam proximate receptacles 182. The height of sides 177 is slightly less than the height of inner surfaces 175 from reservoir support 82 to upper edges 91, so that top edge 187 of closure 5 is generally at the same height as upper edge 91 when closure 5 is closed.

Closure 5 is provided with curved baffles 188 proximate the front and back of closure 5, to further restrict the flow of steam from appliance 1. Baffles 188 extend downwardly from closure 5 about the same distance as sides 177, conform to the curvature of the upper perimeter of reservoir 95, and are spaced horizontally inward slightly from reservoir 95 when closure 5 is closed so that condensate forming on baffles 188, and on the underside of closure 5 between baffles 188, will drip back into reservoir 95.

Closure 5 is provided with a curved front surface 190 terminating in a horizontally extending lip 191 by which closure 5 may be opened. Closure 5 is also provided with a curved back surface 193 having a height less than sides 177, so that when closure 5 is closed back surface 193 is separated from reservoir support 82 by space 194. Space 194 allows closure 5 to pivot open without interference from reservoir support 82, and provides a passage for steam from reservoir 95. Closure 5 is also provided with vents 196 proximate back surface 193, to facilitate the escape of steam.

Electrical power is provided to appliance 1 through plug 112, attached to power cord 200 which passes through opening 201 in back 10. Clamp 202 secures power cord 201 to back 10. Panel 85 is provided with a T-shaped bar 204 around which cord 200 may be wound for storage. A post 205 extends from the underside of base 6, around which cord 200 is wrapped. A strain relief clip 206 is affixed to post 205, held in place by clamp washer 209, to secure cord 200 to base 6. Clip 206 comprises a box-like member having a central opening through which post 205 projects, and having a side opening through which cord 200 enters and exits. Clamp 202 and clip 206 act together to minimize strain on power cord 200 during folding and unfolding of appliance 1.

An indicator light 207 is connected through thermostat 113 to the power supply, visible through lens 208 in front 18 of body 2. Energization of heating element element 110, by depressing reset button 120, causes indicator light 207 to light. When the liquid in reservoir 95 is heated to near boiling, thermostat 113 turns off power to heating element 110, extinguishing light 207.

It is preferred that all parts not subject to substantial elevated temperature be made of plastic, although any other convenient structural material can be used.

The embodiment described above is the preferred embodiment of this invention. It will be apparent to those skilled in the art that various changes may be made without departing from the invention in its broader aspects. For example, without limitation, first hinge member 11 may part of sidewalls 4 rather than back 10. First hinge member 11 can be a separate item which is glued or otherwise secured in place, or it can be molded, cast, or otherwise formed with back 10 or sidewalls 4. First hinge member 11 can be affixed to either the body 2 or the support 2, as can second hinge member 12. One of the shoulders 9 can bear a non-locking conventional hinge instead of a hinge of this invention. Panel 85 can be omitted, allowing body 2 to rotate 360 degrees about axis 16. The latter facility might be of value in an undercabinet installation. The appended claims are intended to cover all such changes as fall within the intent and scope of the present invention.

I claim:

1. A foldable household appliance comprising a support and a body pivotally connected thereto, further comprising
a first appliance part comprising one of said body and said support, having a first hinge member having a side wall and a back wall forming a bore having an axis,
a second appliance part comprising the other of said body and said support, said second appliance part having a second hinge member rotatable about said axis relative to said first appliance part, said second hinge member adjacent to said first hinge member and having a partition having a passage therethrough in alignment with said bore,
a locking member, adapted to be received by said bore in slidable engagement therewith along said axis, and having a contact surface adapted to allow movement of said locking member along said axis between a first position and a second position upon the application of force thereto,
means to substantially prevent rotation about said axis of said locking member relative to said bore,
an axle extending through said passage in said second hinge member, and adapted to engage said locking member to allow axial movement of said locking member thereby, said axle manually movable between an initial position corresponding to said first position of said locking member, and a final position corresponding to said second position of said locking member, said axle having a bearing surface slidably engaging said second hinge member adapted to substantially prevent movement of said axle relative to said second hinge member in a direction transverse to said axis, said axle adapted to engage said locking member such that movement of said locking member relative to said axle is substantially prevented in a direction transverse to said axis, said axle rotatable about said axis with respect to at least one of said second hinge member and said locking member,
interlocking means comprising a depression on one of said second hinge member and said locking member and a projection on the other of said second hinge member and said locking member, adapted to be in mutual engagement when said locking member is in said first position, and adapted to be mutually disengaged when said locking member is in said second position,
biasing means biasing said interlocking means in mutual engagement,
whereby said first appliance part and said second appliance part are locked together in an initial rotational position when said interlocking means is biased in mutual engagement, and whereby said first appliance part and said second appliance part can be unlocked by moving said axle from said initial position to said final position to disengage said interlocking means, thereby allowing said body and said support to be pivoted about said axis relative to one another out of said initial rotational position.

2. The appliance of claim 1, wherein said first appliance part comprises said body and said second appliance part comprises said support, and wherein said support comprises a frame having a pair of opposite shoulders at least one of which bears a second hinge member, and said body bears a first hinge member adjacent to said second hinge member, said body being pivotable with respect to said frame in an arc of at least about 90 degrees.

3. The appliance of claim 2, wherein said support comprises a generally horizontal base adapted to receive a container, and an upstanding frame having a back wall and a pair of generally parallel side rails both of which bears a shoulder comprising a second hinge member, and said body having a closure, sidewalls, and a bottom wall enclosing an electrically heated reservoir, said body having a discharge opening in said bottom wall for discharge of heated liquid into said container, said body having a pair of opposite lower corners adjacent to said shoulders, both of said corners comprising a first hinge member, said first hinge members and said second hinge members having common axes, said bottom wall being generally perpendicular to said back wall in said initial rotational position of said body relative to said support and being adjacent to and generally parallel with said back wall in a second position of said body.

4. The appliance of claim 3, wherein said axle engagement surface comprises a manually engagable button proximate said second hinge member.

5. The appliance of claim 4, wherein said means to substantially prevent rotation of said locking member relative to said bore comprise cross-sectional non-circularity of said locking member and said bore in a plane generally perpendicular to said axis.

6. The appliance of claim 5, wherein said cross-sectional non-circularity comprises a vane on one of said first wall and said locking member, generally parallel to said axis, and a slot adapted to receive said vane on the other of said first wall and said locking member.

7. The appliance of claim 6, wherein said locking member has a sleeve forming an opening through said locking member, said opening adapted to receive said axle in engagement with said sleeve.

8. The appliance of claim 7, wherein said back wall has an interior surface within said bore, and an opposite exterior surface, and has an orifice through which said axle projects, and said axle bears a lobe which engages said exterior surface of said back wall.

9. A foldable household appliance, comprising
a body,
a support for said body,
a first hinge means on one of said body and said support, comprising a first wall forming a first aperture,
a second hinge means on the other of said body and said support, comprising a second wall forming a second aperture aligned with said first aperture,
an axle slidably engaging said second wall, movable along a longitudinal axis, and projecting through said second aperture, having an intermediate abutment and an end engagement surface,
a locking member having a sleeve forming a cavity adapted to receive said axle in engagement with said sleeve, rotatable about said axis relative to said second hinge means, said locking member having a front portion adapted to engage said abutment of said axle and a back portion adapted to be received by said first aperture in slidable engagement with said first wall,
means on said first wall to substantially prevent rotation of said locking member about said axis relative to said first hinge means,
engagement means on said front portion of said locking member and said second hinge means whereby said locking member and said second hinge means can be fixedly engaged,
biasing means to bias said locking member in engagement with said second hinge means,
whereby said body and said support may be locked in one position relative to one another, wherein said biasing means urges said locking member into engagement with said second hinge means to prevent rotation about said axis of said body relative to said support, and said body and said support may be unlocked and rotated about said axis relative to one another by depressing said end engagement surface to engage said abutment of said axle with said front portion of said locking member thereby moving said locking member against said biasing means and out of engagement with said second hinge means.

10. The appliance of claim 9, wherein said means to substantially prevent rotation of said locking member relative to said first hinge means comprise cross-sectional non-circularity of said locking member and said first aperture in a plane generally perpendicular to said axis.

11. The appliance of claim 9, wherein said means to substantially prevent rotation of said locking member relative to said first hinge means comprise a vane on one of said first wall and said locking member, generally parallel to said axis, and a slot adapted to receive said vane on the other of said first wall and said locking member.

12. The appliance of claim 11, wherein said first wall comprises a side wall and a back wall forming a cavity comprising said first aperture, said cavity adapted to receive substantially all of said locking member.

13. The appliance of claim 12, wherein said axle end engagement surface comprises a manually engagable button adapted to be received substantially completely by said support.

14. The appliance of claim 13, wherein said axle is coupled to said first wall to limit movement of said axle along said axis.

15. The appliance of claim 14, wherein said body bears said first hinge means and has a generally planar bottom wall, and said support comprises a frame bearing said second hinge means, said bottom wall and said frame being generally perpendicular when said body and said support are in a first, locked, rotational position relative to one another, and said bottom wall and said frame being generally parallel and adjacent to one another when said body and said support are in a second rotational position.

16. The appliance of claim 14, wherein said support comprises a base having a generally horizontal surface adapted to receive a container, said base having a pair of opposite sides and upstanding rails extending therefrom, each of said rails bearing second hinge means, and said body is cantilevered from said rails by said first hinge means and comprises an electrically heated reservoir having a discharge opening adapted to discharge heated liquid into said container.

17. The appliance of claim 16, wherein said rails are separated by a generally planar panel, and said body comprises generally parallel sidewalls and a generally planar bottom wall generally perpendicular to said sidewalls, said bottom wall and said rails being generally perpendicular to one another when said body and said support are in a first, locked, rotational position, said sidewalls and said rails being adjacent to one another in said second rotational position and said bottom wall and said panel being adjacent to one another in said second rotational position.

18. A foldable household appliance, comprising a support and a body pivotally connected thereto, further comprising a cup-shaped vessel disposed in said body having a wall comprising a sidewall defining an open mouth, and a bottom wall, capable of holding liquids, a closure for said vessel, an electrical heating element adapted to provide heat to said vessel, means to connect said heating element to a power source, a passage forming an opening in said wall, through which liquid in said vessel may be drained, a valve in said passage, having an open position and a closed position, a first hinge means on said body, comprising a first wall comprising a side wall and a back wall forming a bore, a second hinge means on said support, adjacent said first hinge means, comprising a second wall forming an aperture aligned with said bore, a locking member having a shoulder forming a sleeve, rotatable about said axis relative to said second hinge means, said locking member adapted to be received by said bore in slidable engagement with said first wall in a first axial position and in a second axial position in which said locking member is substantially completely received by said bore, a pivot shaft extending through said aperture and received by said opening in said locking member, slidable along a longitudinal axis, having an abutment adapted to engage said shoulder of said locking member, and having an end engagement surface, means on said first wall to substantially prevent rotation of said locking member about said axis relative to said first hinge means, engagement means on said front portion of said locking member and said second hinge means whereby said locking member and said second hinge means are fixedly engaged when said locking member is in said first axial position and are disengaged when said locking member is in said second axial position, biasing means to bias said locking member in engagement with said second hinge means, whereby said body and said support may be locked in one rotational orientation relative to one another, wherein said biasing means urges said locking member into engagement with said second hinge means to prevent rotation about said axis of said body relative to said support, and said body and said support may be unlocked and rotated about said axis relative to one another by depressing said end engagement surface of said pivot, shaft to move said locking member from said first axial position to said axial second in which it is substantially recessed within said bore.

19. The appliance of claim 18, wherein said support comprises a base and a frame extending upwardly from said base, said frame having a pair of oppositely disposed sides terminating in upper shoulders at least one of which bears said second hinge means, said end engagement surface comprising a manually engagable button adjacent to said second hinge means, and wherein said body comprises a generally box-shaped container having said cover mounted thereon, and having said vessel, said electrical heating element, and said valve disposed therein, said body having a pair of oppositely disposed sidewalls adjacent to said upper shoulders, at least one of which bears said first hinge means.

20. The appliance of claim 19, wherein said support comprises a base and a frame extending upwardly from said base, said frame having a pair of oppositely disposed sides terminating in upper shoulders at least one of which bears said second hinge means, said end engagement surface comprising a manually engagable button adjacent to said second hinge means, and wherein said body comprises a container open at the top and having a cover mounted thereon, and having said vessel, said electrical heating element, and said valve disposed therein, said body having a back wall bearing said first hinge means.

21. The appliance of claim 20, wherein said body is generally box-shaped having sidewalls and a removably affixed back, said back having an upper portion, means to removably affix said upper portion of said back to said body, and having a lower portion bearing said first hinge means, said side walls having lower sections having integral hook-shaped portions adapted to interlock with said first hinge means when said back is in position on said body, such that said back can be removably affixed to said body by interlocking said side walls with said first hinge members and affixing said upper portion of said back to said body.

* * * * *